(12) United States Patent
Pham et al.

(10) Patent No.: US 11,120,490 B1
(45) Date of Patent: Sep. 14, 2021

(54) GENERATING VIDEO SEGMENTS BASED ON VIDEO METADATA

(71) Applicant: Amazon Technologies, Inc., Seattle, WA (US)

(72) Inventors: Dominick Khanh Pham, Seattle, WA (US); Sven Daehne, Seattle, WA (US); Mike Dodge, Seattle, WA (US); Janet Galore, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 274 days.

(21) Appl. No.: 16/432,841

(22) Filed: Jun. 5, 2019

(51) Int. Cl.
| | |
|---|---|
| *H04N 9/80* | (2006.01) |
| *G06Q 30/06* | (2012.01) |
| *G11B 27/34* | (2006.01) |
| *G10L 25/78* | (2013.01) |
| *G11B 27/031* | (2006.01) |
| *G06F 16/783* | (2019.01) |
| *G06F 16/78* | (2019.01) |
| *G06K 9/00* | (2006.01) |

(52) U.S. Cl.
CPC ..... *G06Q 30/0625* (2013.01); *G06F 16/7834* (2019.01); *G06F 16/7837* (2019.01); *G06F 16/7867* (2019.01); *G06K 9/00765* (2013.01); *G06Q 30/0641* (2013.01); *G10L 25/78* (2013.01); *G11B 27/031* (2013.01); *G11B 27/34* (2013.01)

(58) Field of Classification Search
CPC .. G06F 16/71; G06F 16/7837; G06F 16/7834; G06F 16/7335; G06F 16/7867; G06F 16/7844; G11B 27/34; G11B 27/28; G11B 27/031; G06Q 30/0601

USPC .......... 386/241, 248, 278, 285, 281
See application file for complete search history.

(56) References Cited

U.S. PATENT DOCUMENTS

| | | | |
|---|---|---|---|
| 8,990,692 | B2 | 3/2015 | Chelba |
| 9,824,691 | B1 | 11/2017 | Montero et al. |
| 10,176,846 | B1 | 1/2019 | Sreedhara |
| 2012/0323897 | A1 | 12/2012 | Daher et al. |
| 2013/0283307 | A1* | 10/2013 | Avedissian ......... G06Q 30/0278 725/23 |

(Continued)

FOREIGN PATENT DOCUMENTS

WO    2010117213  A2    10/2010

OTHER PUBLICATIONS

U.S. Appl. No. 16/437,649, "Association Object Related Keywords with Video Metadata," filed Jun. 11, 2019.

(Continued)

*Primary Examiner* — Robert Chevalier
(74) *Attorney, Agent, or Firm* — Patterson + Sheridan, LLP

(57) ABSTRACT

A video segmenting system identifies a product for sale in a video and determines one or more attributes of audio and video content within the video. The video segmenting system determines a video segment within the video that is associated with the product for sale, based on the attributes. The video segmenting system generates a tag that associates the product for sale with the video segment and sends an indication of the tag to a user device. Once the video is played on a user device, the user device detects a search query about the product for sale. Using the tag, the user device can display a marker on the user device corresponding to the location of the video segment within the video.

20 Claims, 16 Drawing Sheets

(56) References Cited

U.S. PATENT DOCUMENTS

| | | |
|---|---|---|
| 2015/0113013 A1 | 4/2015 | Rys et al. |
| 2015/0120726 A1 | 4/2015 | Jain et al. |
| 2016/0342590 A1 | 11/2016 | Paulin |
| 2017/0083620 A1 | 3/2017 | Chew et al. |
| 2018/0035151 A1* | 2/2018 | Jassin ................ H04N 21/4828 |
| 2019/0080207 A1 | 3/2019 | Chang et al. |
| 2020/0336802 A1* | 10/2020 | Russell ............ H04N 21/26603 |

OTHER PUBLICATIONS

PCT Notification of Transmittal of the International Search Report and the Written Opinion of the International Searching Authority, or the Declaration for Application No. PCT/US2020/036908 dated Sep. 28, 2020.

\* cited by examiner

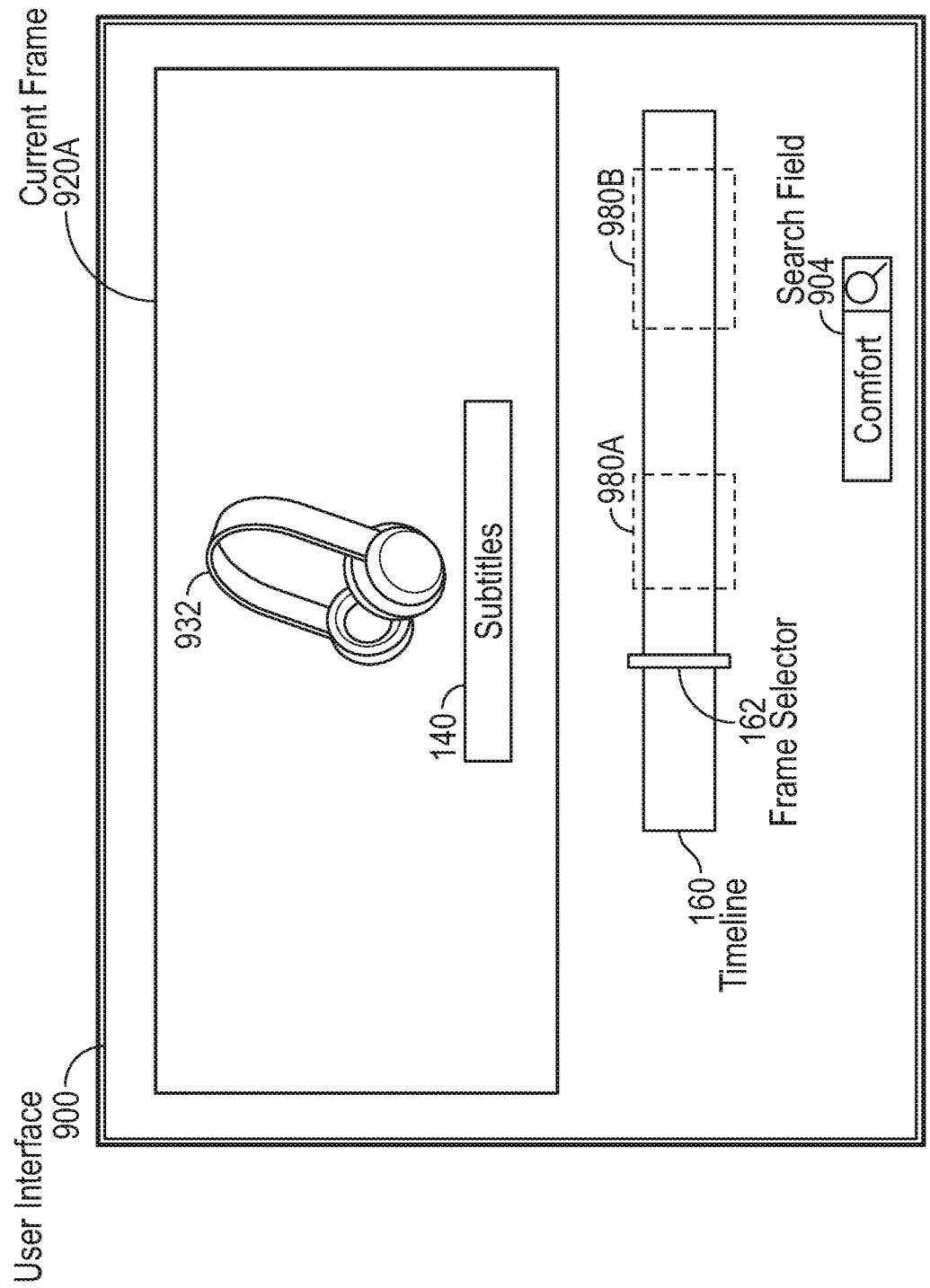

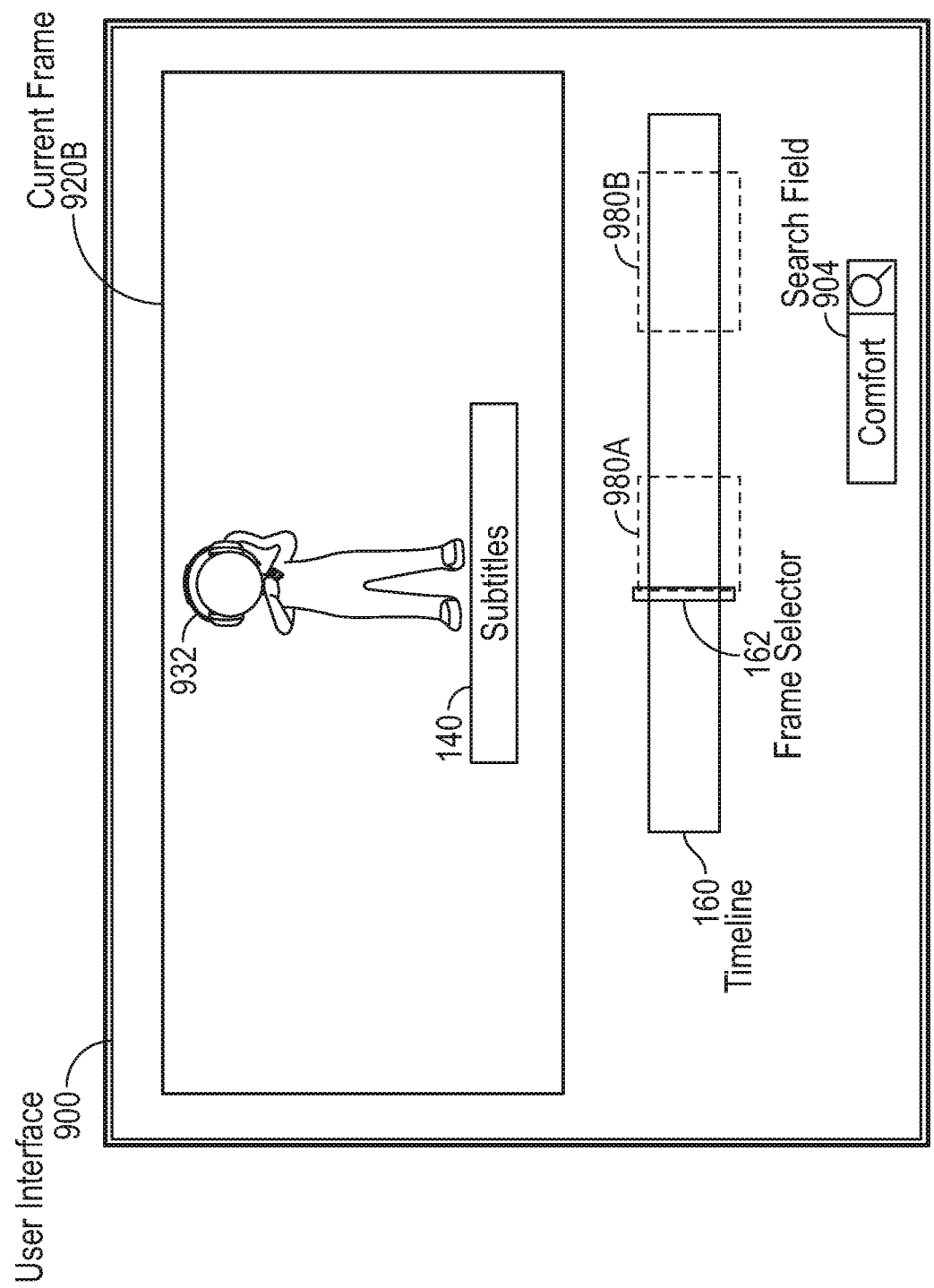

GENERATING VIDEO SEGMENTS BASED ON VIDEO METADATA

BACKGROUND

The present invention relates to generating object-related video segments based on video metadata.

Currently, video consumption, navigation, and interaction is fairly limited. For example, users can fast forward a video, rewind the video, adjust the play speed of the video, scrub the seeker to skip to different frames in the video, or jump forward/backward by a predefined period of time. This limited interaction allows for some level of coarse navigation of a video, but does not allow a user to search for specific video segments or clip locations within the video associated with objects in the video. Further, when navigating with coarse controls, the user can be uncertain as to whether relevant content has been skipped or whether the user needs to keep advancing through the video. This is due in part to the lack of contextual metadata available for the video. As a result, searching and navigation the contents of a video (or a collection of videos) for particular content is laborious and inefficient.

BRIEF DESCRIPTION OF DRAWINGS

FIGS. 9A-9C illustrate an example user interface of a user device, according to one embodiment.

DETAILED DESCRIPTION

Embodiments herein describe a video segmenting system that can generate video segments associated with an object (e.g., product) (or a collection of objects) in a video. For example, the video may be a review video describing the performance of different travel headphones, a promotional video advertising different items for decorating a house, a video advertising sporting equipment for sale, etc. The video segmenting system can identify the object(s) (e.g., product(s)) that are associated with a video based on object identifiers (or identities) (IDs) associated with the video. Assuming the object is a product for sale, the product ID can include, e.g., a particular brand and model of a smartphone, a model number of a toy set, or a standard identification number. Based on knowledge of the particular objects that appear in the video, the video segmenting system can use the audio/visual (A/V) data associated with the video and/or other video metadata to determine segments of the video that are relevant to the objects. Each segment is defined by a start frame (e.g., starting time instance) and stop frame (e.g., ending time instance) within a duration (or timeline) of the video. The video segmenting system can generate video segments that correlate to different hierarchies of content (e.g., sentence level, paragraph level, topic level, chapter level, etc.) within the video. The video segmenting system can send an indication of the segments to a user device playing the video.

The video segmenting system enables a user to easily search and navigate for particular content within a video (or a collection of videos). For example, a user may identify an object (e.g., a product for sale, an actor in a scene, etc.) that the user is interested in from a video displayed on a user device (e.g., a television, tablet, smartphone, etc.). In another example, a user may search an online service (e.g., e-commerce/retail website) for information regarding a particular product (or for the product itself) from a retailer's inventory. Using the user device (or an input/output (I/O) device communicatively coupled to the user device), the user can search for terms relevant to the object in the video. For example, the user may search for "sound quality" for a pair of headphones that are mentioned in the video. In this example, the user device can retrieve the relevant video segments associated with "sound quality," and display markers on the user interface (UI), indicating the relevant video segments. The markers enable the user to quickly navigate (e.g., jump, ingress, etc.) to different portions of the video that are of interest to the user. In this manner, embodiments help the user to easily learn more information about the object associated with the video. This, in turn, enables the user to make a more informed decision as to whether the user would like to purchase the product in the video.

Figure 1:
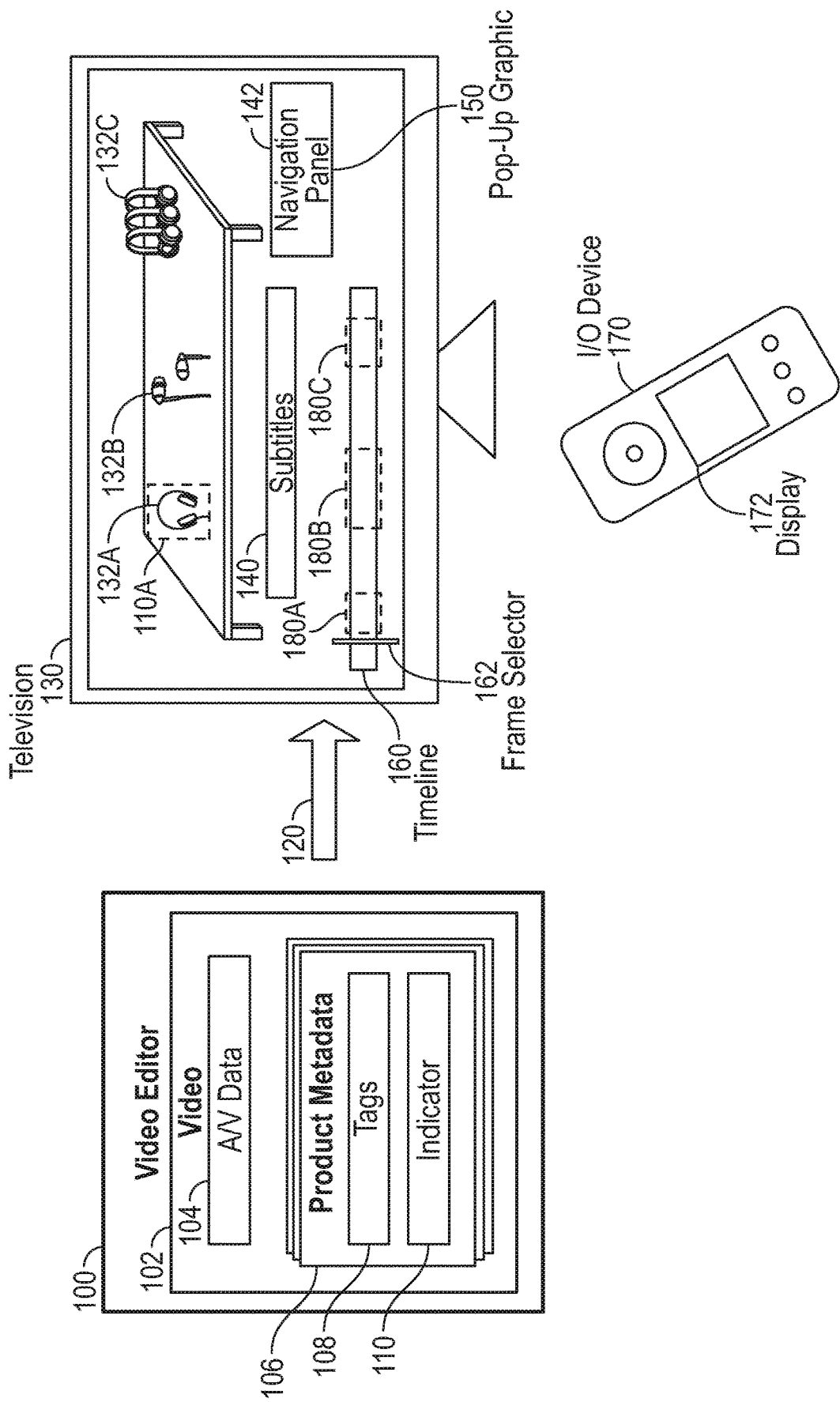
FIG. 1 illustrates indicating video segments on a user device associated with an object in a video, according to one embodiment.

FIG. 1 illustrates indicating video segments on a user device associated with an object in the video, according to one embodiment. FIG. 1 includes a video editor 100, a television 130, and an I/O device 170. In one embodiment, the video editor 100 adds product metadata 106 into a video 102, based on A/V data 104 corresponding to the video. The product metadata 106 includes additional contextual information regarding the product in the video that may help a user viewing the video 102 to decide whether to purchase the product in the video 102. In this embodiment, the product metadata 106 includes tags 108 and indicators 110.

The tags 108 indicate the relevant video segments associated with the product. Each tag 108 can include the type of object associated with the video, the object (product) ID, keywords (search terms) associated with the type of object, the location of video segment in the video, and hierarchal level associated with the video segment. The keywords can include terms (or words) mentioned in the video 102 and/or terms that are not mentioned in the video 102 (e.g., the unmentioned terms may be related (or similar) to other terms mentioned in the video 102). The location of the video segment in the video may be indicated by the start frame (or time instance) and the stop frame (or time instance). The indicator 110 identifies a location of the object (e.g., product) within the video 102. In one embodiment, the indicator 110 can identify the location of the object for a given frame of the video 102. For example, the relative position of the product in the video can move as the camera angle changes or as the product itself moves.

In one embodiment, the tags 108 and the indicator 110 are stored in one or more files as metadata. The metadata can be stored with the video, e.g., in addition to the A/V data 104 of the video 102, or can be stored elsewhere (e.g., in the cloud). For example, when the user inputs a particular keyword, a user device can retrieve the tags 108 and/or the indicator 110 from a server (e.g., in the cloud). In another embodiment, the tags 108 and/or the indicator 110 can be transmitted as a package with the video 102 to the television 130.

The arrow 120 illustrates transferring the video 102 to a television 130. For example, the television 130 may be internet-capable so it can download the video 102 from a video distribution system. A user (not shown) can use the I/O device 170 to play the video 102 on the television 130. For example, the I/O device 170 can include controls for navigating through a UI (on the television 130) which offers multiple videos, selecting a video, and playing the selected video. In this example, the I/O device 170 is a remote that includes interactive buttons and controls. In one embodiment, the I/O device 170 allows the user to input (e.g., via an interactive keyboard displayed on the UI on the television 130) queries containing keywords related to an object (e.g., product for sale) displayed (or mentioned) in the video 102. Additionally, or alternatively, in one embodiment, the I/O device 170 includes an audio device (e.g., a microphone) for receiving audio input from the user. Using the audio device, the user can input queries (or searches) for keywords related to a product displayed (or mentioned) in the video 102. The I/O device 170 also includes a screen/display 172, which allows the user to interact with content received from video editor 100 and/or the television 130. The screen/display 172 can be implemented as a touch screen interface.

As the video 102 plays, the user may see (or hear about) an object (e.g., product for sale) the user wishes to learn more about. In this example, the current frame of the video 102 being displayed on the television 130 includes three products 132 (e.g., a first headphone device (product 132A), a second headphone device (product 132B), and a third headphone device (product 132C)). Using the I/O device 170, the user can search for more information related to one of the products (e.g., product 132A) or for more information related to a collection of products (e.g., products 132 A-C). In one example, the user can search for a keyword related to one or more of the products. The keyword can be a word that has been mentioned in a previous (or current) frame in the video 102, a word that appears in subtitles 140, a word that the user infers will be mentioned in the video 102 about the product, or a suggested word (generated by the video editor 100) that appears in the navigation panel 142, a brand name of the product (e.g., "Brand A"), etc.

The I/O device 170 can include a scroll wheel or arrow keys to navigate to different parts of the UI on the television 130 in order to search for more information about a product. For example, using (left, right, up, and down) arrow buttons, the user can navigate through different keywords presented in the navigation panel 142, keywords presented in subtitles 140, etc. In another example, using arrow buttons, the user can navigate through the different products displayed on a current frame of the television 130. Here, for example, once the video 102 is paused, the user can select product 132A based on indicator 110A. Once a keyword or a given product is highlighted, the user can use a different button to submit a query for the selected keyword or product. In another example, the user can use the arrow buttons to type a keyword on a virtual keyboard within the UI of the television 130. In another example, rather than navigating through subtitles 140 and navigation panel 142, the user can navigate on the I/O device 170 itself, if the I/O device 170 is provisioned with a screen/display 172 and communication infrastructure (e.g., Bluetooth) to allow communication with the video editor 100. In yet another example, rather than using buttons, keys, or capacitive elements, the user could use voice commands (e.g., "search for audio quality") to submit a query for a keyword.

Once the user submits a keyword, the television 130 presents markers 180 in the timeline 160 to identify the video segment locations related to the keyword. In this particular example, the television 130 presents three markers 180A, 180B, and 180C that indicate different video segment locations. Using the I/O device 170, the user can select the different markers 180A-C to jump to the start frame of a video segment that is related to the user's search about a given product, e.g., to learn more information regarding the product. In some examples, the user can select the frame selector 162 to navigate to the different markers 180A, 180B, and 180C to learn more information regarding the product.

Depending on the user's current interaction with the video 102, the television 130 can display the navigation panel 142 in a pop-up graphic 150. That is, the pop-up graphic 150 may overlay certain portions of the video 102 being displayed. In some embodiments, the pop-up graphic 150 may appear adjacent to the video 102, e.g., in a side panel of a UI on the television 130. In some embodiments, the pop-up graphic 150 may appear when the video 102 has been paused.

While the embodiments herein primarily discuss generating video segments associated with products for sale in a video, this disclosure is not limited to products for sale and can be used for other applications. For example, the embodiments herein can be used to enhance user experience when watching a television show or movie. Instead of generating relevant video segments associated with a product for sale, the video editor 100 can generate video segments (or clips) related to actors in a scene. For example, the user can search for the actor's name to find relevant video segments of other scenes in the current show in which the actor appears. In general, using the techniques described herein, the video editor 100 can generate video segments related to any object (e.g., product for sale, a person, object, geographical landmark, etc.) in a video 102.

Figure 2:
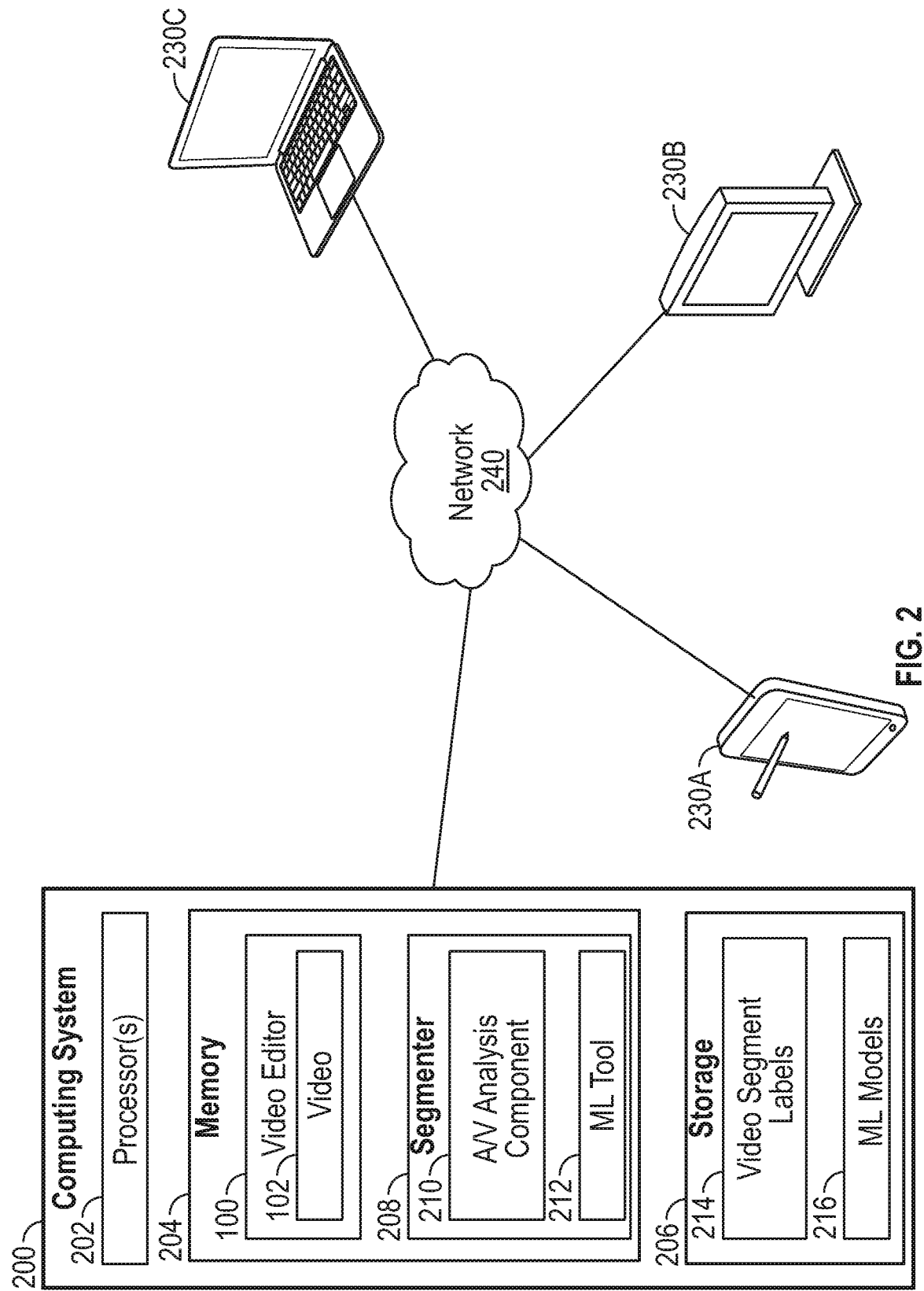
FIG. 2 is a block diagram for generating video segments associated with an object in a video, according to one embodiment.

FIG. 2 is a block diagram for generating video segments associated with an object in a video, according to one embodiment. FIG. 2 includes a (video segmenting) computing system 200, a network (e.g., video distribution network) 240, and user devices 230. The computing system 200 includes a processor(s) 202, a memory 204, and storage 206. The processor(s) 202 represents any number of processing elements which can include any number of processing cores. The memory 204 can include volatile memory, non-volatile memory, and combinations thereof. The storage 206 may be a disk drive storage device. Although shown as a single unit, storage 260 may be a combination of fixed and/or removable storage devices, such as fixed disc drives, removable memory cards, or optical storage, network attached storage (NAS), or a storage area-network (SAN). In one embodiment, the computing elements (or components) shown in the computing system 200 may correspond to a physical computing system or may correspond to one or more virtual computing instances executing within a computing cloud. Here, the storage 206 includes video segment labels 214 and machine learning (ML) models 216, described in more detail below.

The memory 204 includes the video editor 100 and a segmenter 208. The video editor 100 may be a software application executing on the computing system 200. In one embodiment, the video editor 100 permits a user to generate tags 108 that indicate video segments in a video 102 related to a given object (or collection of objects) in the video 102. This process is described in more detail below.

The segmenter 208 may be a software application executing on the computing system 200. The segmenter 208 generates video segments related to an object (or a collection of objects) in the video, based on A/V data 104 and/or other metadata associated with the video 102. The segmenter 208, for example, can derive (generate) video segments that can be searchable by a user device (e.g., user device 230) or sent to the user device, based on keywords associated with the object in the video. In some embodiments, the segmenter 208 can derive video segments that correspond to different contexts of the content of the video within a hierarchy of contexts. As an example, the different contexts of the content may correspond to a sentence level, paragraph level, chapter level, etc. Note, however, that this is merely a reference example of a hierarchy that can be used. Using this reference example, the content of the video segment that is generated may correspond to one of a sentence, paragraph, chapter, etc. within the overall content of the video. The segmenter 208 can generate tags 108 to indicate the video segments associated with a given object in the video 102. In this embodiment, the segmenter 208 includes an A/V analysis component 210 and a ML tool (or application) 212.

The A/V analysis component 210 is configured to analyze the A/V data 104 of the video 102 to determine one or more attributes of the audio and video content of the video 102. As used herein, the attributes of the audio and video content within the video may be distinct from attributes associated with encoding and/or quality of the video, such as bit rate, size, dimension, etc. For example, the attributes of the audio and video content may include acoustic features of the audio content, such as different audio or music, pitch (or intonation), speech pause cadence of a person, etc., and/or visual features, such as appearance of objects in the video, text overlays in the video, etc.

The A/V analysis component 210 can employ a variety of audio and visual analysis techniques. In one embodiment, the A/V analysis component 210 can evaluate the A/V data 104 to determine whether (and how) the video 102 has been edited. For example, the A/V analysis component 210 can identify music/audio cuts (or transitions) and correlate the transitions to different video content segments. A review video describing different headphones, for example, may play different audio (or songs) when describing different attributes of the headphones (e.g., a first song when describing the battery life of the headphones, a second song when describing the comfort/fit of the headphones, etc.). In another example, the review video describing different headphones may play different audio when describing the different headphones (e.g., a first song when describing Brand A headphone device, a second song when describing Brand B headphone device, etc.).

In some embodiments, the A/V analysis component 210 can identify when and how titles appear in the video 102 to infer (determine) different content segments, which the segmenter 208 can use to generate video segments. For example, a promotional video advertising different items for decorating a house may have been edited to include titles to denote when the video is transitioning to different locations in the house (e.g., "Kitchen" when discussing kitchen items, "Bedroom" when discussing bedroom items, and the like). In this example, the A/V analysis component 210 can determine that the frame in the video when the title "Kitchen" appears defines a start frame of a chapter level video segment for Kitchen items and that the subsequent frame in the video when the title "Bedroom" appears (or prior to when the title "Bedroom" appears) defines a stop frame of the chapter level video segment for Kitchen items.

In some embodiments, the A/V analysis component 210 can identify transitions in the video content, based on differences between sequences of frames of the video 102. For example, the A/V analysis component 210 can evaluate the visual differences between sequences of frames to determine if a video transition (e.g., scene break or an edit) has occurred. In some cases, for example, the A/V analysis component 210 can identify cross fades, cuts, wipes, fade to black, and the like. In one particular embodiment, the A/V analysis component 10 can perform a visual diff (e.g., differences in pixels) between frames to determine whether a video transition has occurred.

In some embodiments, the A/V analysis component 210 can analyze acoustic features, such as the intonation (or pitch), used in the video 102 to identify different video segments. In another example, the A/V analysis component 210 can evaluate the speech pause cadence of speakers in the video 102 to identify video segments.

In some embodiments, the A/V analysis component 210 can derive video segments based on geolocations identified in frames of the video 102. For example, a video advertising sporting equipment for sale may show snowboards in a first setting (e.g., a ski resort), waterski equipment in a second setting (e.g., lake), etc. In this example, the A/V analysis component 210 can determine that frames with the first setting define a first video segment, the frames with the second setting define a second video segment, and so on.

In some embodiments, the A/V analysis component 210 can derive video segments based on visual attributes (e.g., object appearances) within the video. For example, the A/V analysis component 210 can identify different persons, objects, locations, etc., in different frames of the video 102. In one example, the A/V analysis component 210 can track an object in the frames of the video 102 based on the indicator 110 associated with the object. The A/V analysis component 210 may determine that the frames in which a first object appears define a first video segment, the frames in which a second object appears define a second video segment, etc.

In some embodiments, the A/V analysis component 210 can derive video segments based on external signals associated with the video. The A/V analysis component 210 can monitor a level of social reaction (e.g., chat activity, polls, most watched frames, etc.) to the video 102 and correlate the level of social reaction to different video segments. In some embodiments, the A/V analysis component 210 can derive video segments based on an audio transcription of the video 102. For example, the transcription can include the text of the words mentioned in the audio content of the video 102, a timestamp for each word in the text, and a confidence (or accuracy) level for each word in the text. The confidence level provides an indication (e.g., percentage) that the word in the text has been accurately transcribed from audio content of the video 102.

In general, the segmenter 208 can use any of (or combination of) the above techniques to derive and generate video segments. In one embodiment, for example, the segmenter 208 (via the A/V analysis component 210) can evaluate both the audio and visual content (from A/V data 104) to determine different orders of content in the video 102. For example, the segmenter 208 (via the A/V analysis component 210) may identify sentence video segments, based on an audio transcription of the video 102 and identify paragraph video segments, based on when adjacent sentence video segments line up with a scene break (determined based on the visual content).

In another embodiment, the segmenter 208 can use ML techniques (applications, algorithms, etc.) via the ML tool 212, to derive and generate video segments. The ML tool 212 can be used in addition to, or in alternative to, the A/V analysis component 210. The ML tool 212 can use one or more ML models 216 to generate video segments at different content hierarchies. The ML models 216 may have been trained using supervised machine learning techniques. For example, users can watch videos 102 and mark how each video should be segmented (e.g., divided into video segments). In particular, the users can indicate the start/stop frames of a segment, the context level of the content within the segment (e.g., whether the segments correspond to sentences, paragraphs, chapters, etc.), the object(s) associated with the segment, keyword(s) associated with the segment, etc. Once obtained, the user segmented labels (e.g., video segment labels 214) are used to train the ML model 216. In one embodiment, a different ML model 216 can be trained and used for each different type of video segment.

The network (e.g., video distribution network) 240 can be a wide area network (WAN) or a local access network (LAN) which distributes the video 102 to the user devices 230. The network 240 can be hosted in a cloud computing environment. In one embodiment, the network 240 is part of a subscription service or provided for free to users who sign up for an account. In any case, the network 240 can provide a repository of videos that can be provided to the user devices 230 on-demand or as part of advertisements.

The user devices 230A, 230B, and 230C can be mobile phones, internet-capable televisions, laptops, tablets, streaming players (e.g., online media players), and the like. Using an I/O device (not shown, a user can pause the video 102 currently being played in order to learn more about a particular object in the video 102. The I/O device can be separate from the user device 230—e.g., a remote controller or mouse—or may be an integrated component in the user device 230—e.g., a touch screen or touch pad.

Figure 3:
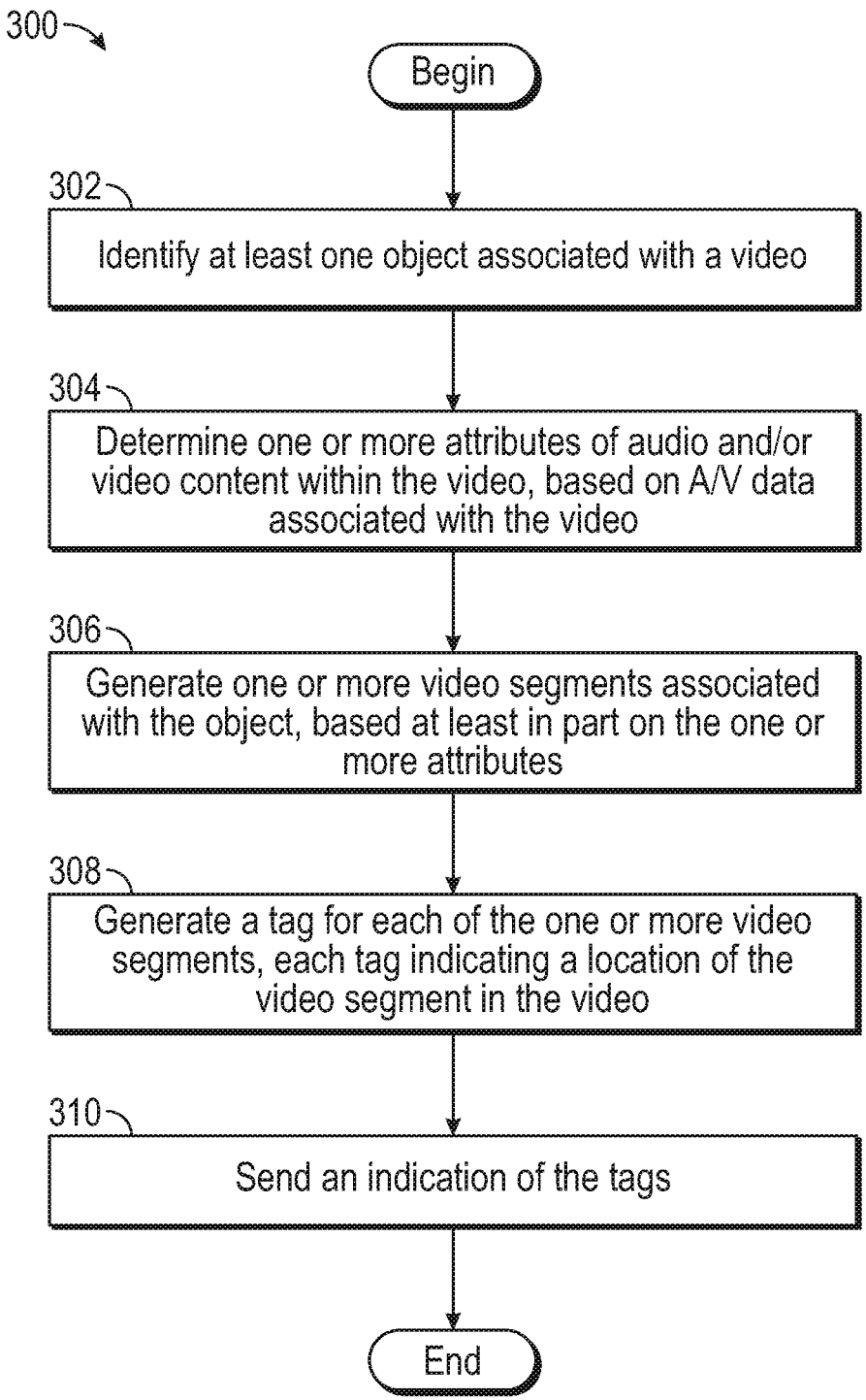
FIG. 3 is a flowchart of a method for generating video segments associated with an object in the video, according to one embodiment.

FIG. 3 is a flowchart of a method 300 for generating video segments associated with an object in the video, according to one embodiment. The method 300 may be performed by one or more components (e.g., video editor 100, segmenter 208, etc.) of a computing system (e.g., computing system 200).

The method 300 begins at block 302, where the computing system identifies at least one object associated with a video (e.g., video 102). As noted, the at least one object can include a product for sale, a person, a geographical landmark, etc. The computing system may identify the object(s) associated with the video based on a set of product IDs configured for that video. For example, the set of product IDs (or other identification information) for the objects may be stored within the video file or within a separate file.

At block 304, the computing system determines one or more (audio and visual) attributes of the video, based on A/V data (e.g., A/V data 104) associated with the video. The attributes can include, but are not limited to, edits to the video (e.g., acoustic (song/music) transitions, content descriptions (titles) added to the video content, visual content transitions, etc.), acoustic features (e.g., intonations, speech pauses, cadence, etc.), visual attributes (e.g., identification of different persons, objects, locations, etc.), external signals (e.g., chat activity, most viewed frames, etc.), and the like.

At block 306, the computing system generates one or more video segments associated with the object, based at least in part on the one or more attributes. In one embodiment discussed below, the video segments may be provided to the computing system (e.g., via the video editor 100) by a user. For example, an advertiser or product reviewer may identify a set of relevant video segments for an object in the video. As discussed below, the video editor 100 may provide a UI (e.g., UI 400) to enable a user to identify video segments relevant to an object in the video. In another embodiment discussed below, the video segments may be determined using a ML tool (e.g., ML tool 212) that implements a ML model (e.g., ML model 216) corresponding to the type of segment. The type of segment can be based on the type/purpose of the video (e.g., advertisement video, review video, etc.) or the type of objects (e.g., products) in the video (e.g., sporting equipment, furniture, headphones, etc.).

At block 308, the computing system generates a tag (e.g., tag 108) for each of the one or more video segments. Each tag indicates a location of the video segment in the video. At block 310, the computing system sends an indication of the tags. In one embodiment, the computing system stores the tags (e.g., as metadata). The tags can be stored in a file associated with the video (e.g., in the cloud) for later retrieval by a user device. In another embodiment, the computing system can package the tags along with the A/V data of the video, and transmit the package to a user device. After block 308, the method 300 ends.

Figure 4:
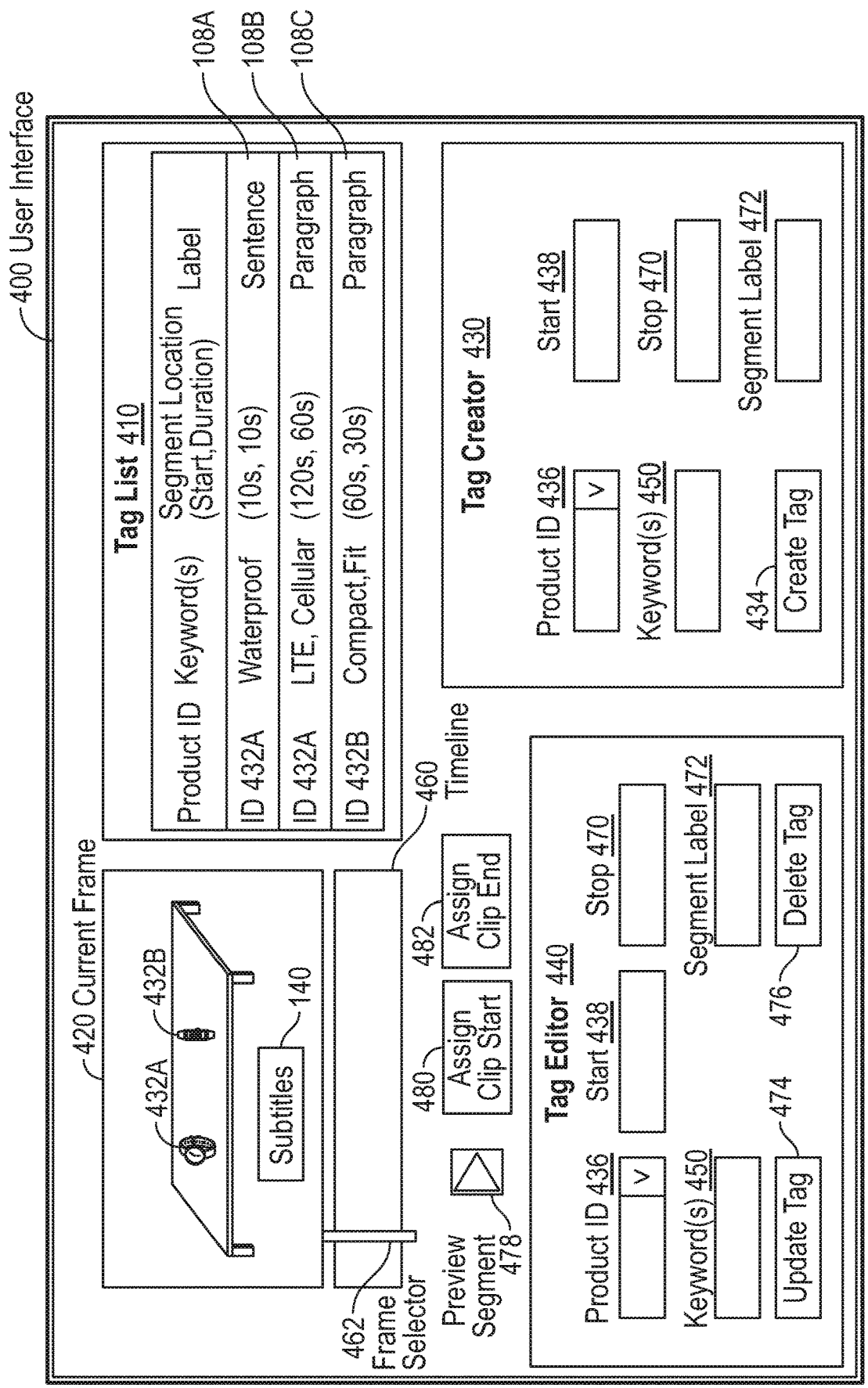
FIG. 4 illustrates an example user interface for generating a tag that indicates the location of a video segment associated with an object, according to one embodiment.

FIG. 4 illustrates a UI 400 of the video editor 100 for generating a tag that indicates the location of a video segment associated with an object, according to one embodiment. In one embodiment, the UI 400 can be used to perform one or more of blocks 302-310 of the method 300 depicted in FIG. 3. The UI 400 can be displayed on a computing system (e.g., computing system 200). The UI 400 includes a current frame 420, a timeline (or seeker bar) 460, a frame selector 462, a preview segment button 478, an assign clip start button 480, an assign clip end button 482, a tag list 410, a tag creator 430, and a tag editor 440. Using the frame selector 462, the user can move across the timeline 460 to select a particular frame in the video, which is displayed as current frame 420. Put differently, the timeline 460 indicates the temporal location of each frame in the video. The frame selector 462 permits the user to select a particular one of the frames to be displayed as the current frame. In one embodiment, the frame selector 462 permits the user to select a video segment (or clip) within the timeline 460. For example, the user can drag the frame selector 462 from a starting point (frame) in the timeline 460 to a subsequent stopping point (frame) in the timeline 460 to view a video segment.

The tag creator 430 includes a Product ID field 436, a Segment Start field 438, a Segment Stop field 470, a Keyword(s) field 450, and a Segment Label field 472, which allow the user to create tags corresponding to indicating video segments associated with particular objects in the video. The Product ID field 436 allows a user to select a product ID associated with one of the objects in the video being displayed and/or mentioned in the audio content associated with the video. In one embodiment, the Product ID field 436 is pre-loaded with a set of Product IDs associated with objects in the video. In this case, the user can select one of the product IDs via a drop-down button in the Product ID field 436. In another embodiment, the Product ID field 436 permits a user to type in product IDs for objects in the video. For example, the user can provide a standard identification number or other unique product ID for an object. In yet another embodiment, the Product ID field 436 may be a search field which permits the user to identify the standard identification number or unique ID by putting in general information such as the type of product, its manufacturer, partial product ID number, and the like. In this case, the Product ID field 436 can provide a list of potential IDs that match the criteria provided by the user from which the user can select the correct product ID. Note, that in other embodiments where the object is not a product for sale (e.g., the object is a person) the UI 400 can provide a field that lets the user identify the object (e.g., name of the actor).

The Keyword(s) field 450 permits a user to identify keywords (or terms) associated with the object (identified by the product ID) in the video. The user can select words or terms that are mentioned in the audio content associated with the video (e.g., the words or terms may appear in the subtitles 140). In other cases, the user can select words that are not mentioned in the audio content to associate with the object. In this case, the unmentioned words or terms may be similar to other words associated with the object, words that the user infers a viewer would likely search for regarding the object in the video, etc. For example, a review video describing different types of headphones might mention the word "comfort" when discussing Brand A headphones, but may not mention the word "fit." In this example, the user may determine that the word "fit" is also related to the Brand A headphones for this video, and may indicate the word "fit" in the Keyword(s) field 450.

The Segment Start field 438 and the Segment Stop field 470 permit a user to indicate a video segment (or clip) location associated with the a time instance in the video when the keyword is mentioned or a time instance that is related to the keyword (e.g., the keyword is indirectly mentioned). In some embodiments, the Segment Start field 438 and the Segment Stop field 470 can be automatically updated with start and stop timestamps, respectfully, based on video segment defined by the frame selector 462, assign clip start button 480, and assign clip end button 482. The Segment Label field 472 permits a user to indicate the content hierarchical level (e.g., sentence level, paragraph level, chapter level, etc.) corresponding to the video segment.

The tag creator 430 includes a create tag button 434 that the user can select to create a tag based on the Product ID field 436, Segment Start field 438, Segment Stop field 470, Keyword(s) field 450, and Segment Label field 472. In response, the created tag is added to the Tag List 410. In this example, the Tag List 410 include tags 108A, 108B, and 108C. Each tag 108 includes the product ID, keyword(s), video segment location (corresponding to the start/stop frames (time instances) in the video associated with the keyword(s)), and the segment label for the video segment. For example, tag 108A indicates that: the segment location for "waterproof" associated with object 432A (e.g., a first watch device) is from 10 seconds to 20 seconds (relative to a start of the video) and corresponds to a sentence within the video; the segment location for "LTE, cellular" associated with object 432A is from 120 seconds to 180 seconds (relative to a start of the video) and corresponds to a paragraph within the video; and the segment location for "compact, fit" associated with object 432B (e.g., a second watch device) is from 60 seconds to 90 seconds (relative to a start of the video) and corresponds to a paragraph within the video.

The UI 400 allows the user to select a tag 108 in the Tag List 410 in order to preview the tag 108 in the UI 400. For example, after selecting a tag 108, the start frame corresponding to the start time instance from the segment location associated with the tag 108 is displayed as the current frame 420. In one embodiment, once a tag 108 is selected, the user can use the Tag Editor 440 to modify the tag 108 or delete the tag 108. In the Tag Editor 440, the user can modify values of the Product ID field 436, Segment Start field 438, Segment Stop field 470, Keyword(s) field 450, and Segment Label field 472. Once modified, the user can select the update tag button 474 to update the values of a tag 108 in the Tag List 410. Alternatively, the user can select the delete tag button 476 to delete a tag 108 from the Tag List 410.

Figure 5:
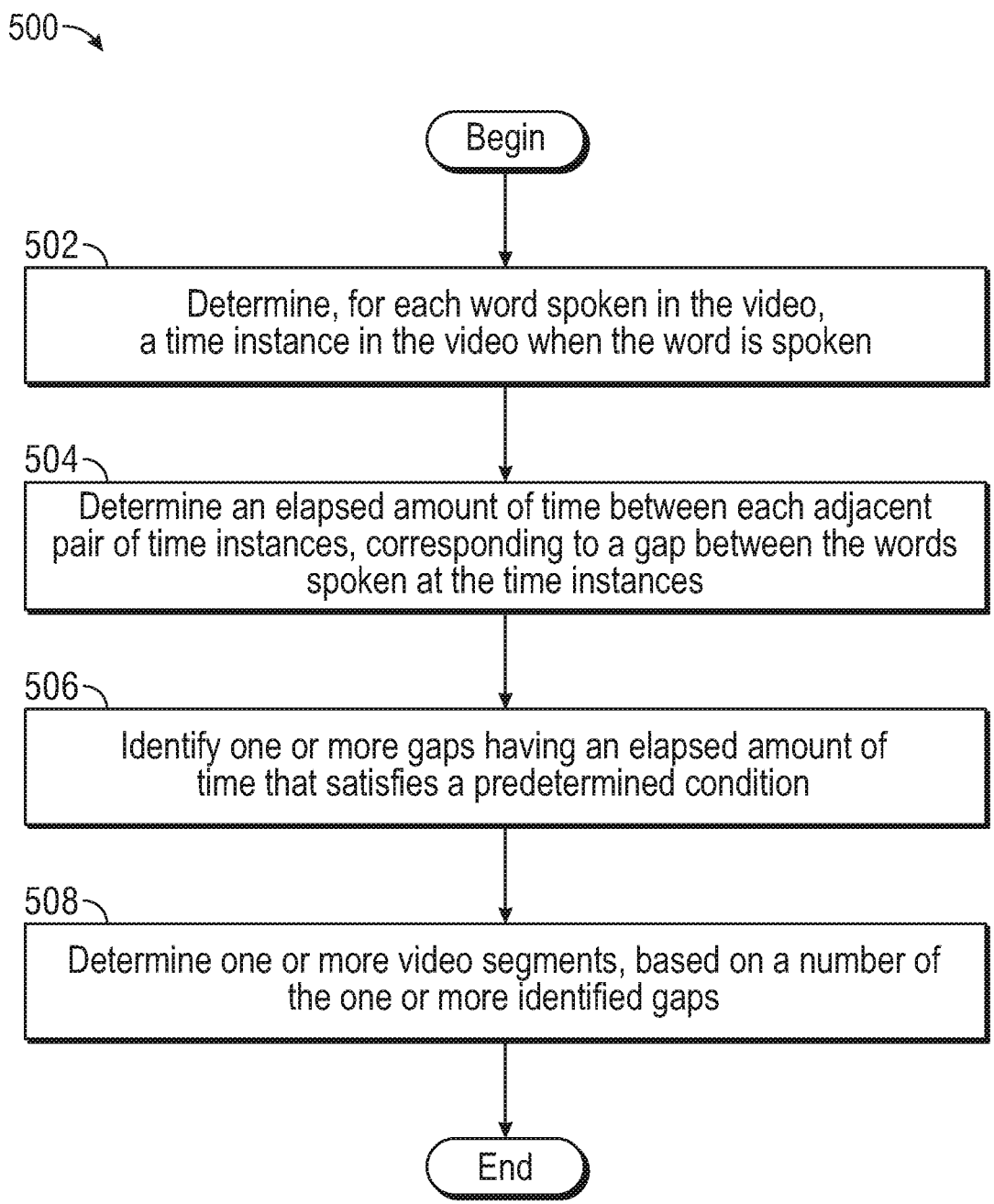
FIG. 5 is a flowchart of a method for determining video segments associated with an object in a video, according to one embodiment.

FIG. 5 is a flowchart of a method 500 for determining video segments associated with an object in a video, according to one embodiment. The method 500 may be performed by one or more components (e.g., video editor 100, segmenter 208, etc.) of a computing system (e.g., computing system 200). The method 500 may be performed as part of blocks 304-306 of method 300 depicted in FIG. 3.

The method 500 begins at block 502, where the computing system determines, for each word spoken in the video, a time instance in the video when the word is spoken. In one embodiment, the computing system can evaluate the A/V data (e.g., A/V data 104) of the video (e.g., using the A/V analysis component 210) to determine the time instances (or frames) when each word is spoken. In one embodiment, the computing system can determine the time instances when each word is spoken based on a transcription of the audio content of the video. In this case, the computing system may obtain (or retrieve) the transcription associated with the video from another computing system (e.g., online transcription service, storage location, etc.). As noted, the transcription can include the text (e.g., words) from the audio content, the timestamp (or time instance) when each word in the text is spoken, and the confidence level that the word transcribed from the audio content is correct. The computing system can identify the timestamps associated with the adjacent words from the transcription and use the timestamps as the respective time instances when the adjacent words are spoken in the video.

At block 504, the computing system determines an elapsed amount of time between each adjacent pair of time instances, where the elapsed amount of time corresponds to a gap (or pause) between the words spoken at the time instances. At block 506, the computing system identifies one or more gaps having an elapsed amount of time that satisfies a predetermined condition. In one embodiment, the predetermined condition is based on an elapsed amount of time that is greater than a threshold amount of time. For example, the predetermined condition can include a predetermined number (e.g., a percentage) of the gaps having the longest duration relative to all of the gaps in the video. In this case, the computing system can identify a number of the longest gaps (e.g., a number of gaps having an elapsed amount of time that is greater than a threshold amount of time).

In one embodiment, the threshold amount of time used for the predetermined condition can be different depending on the speaker. For example, a first threshold may be used for a first speaker that speaks slowly (e.g., has large pauses between words), a second threshold may be used for a second speaker that speaks fast (relative to the first speaker), and so on. In one embodiment, the threshold amount of time can be based on other criteria (or parameters), such as the number of desired segments per video, minimum duration of a video segment, maximum duration of a video segment, and so on.

At block 508, the computing system determines one or more video segments, based on a number of the one or more identified gaps. In one embodiment, the computing system may determine the one or more video segments based on a predetermined number (e.g., a predetermined percentage) of the longest gaps (determined in block 506). For example, the computing system can use the gaps in this set as the delineations for the video segments (e.g., for N number of gaps, the computing system may determine N+1 video segments). After block 508, the method 500 ends.

Figure 6:
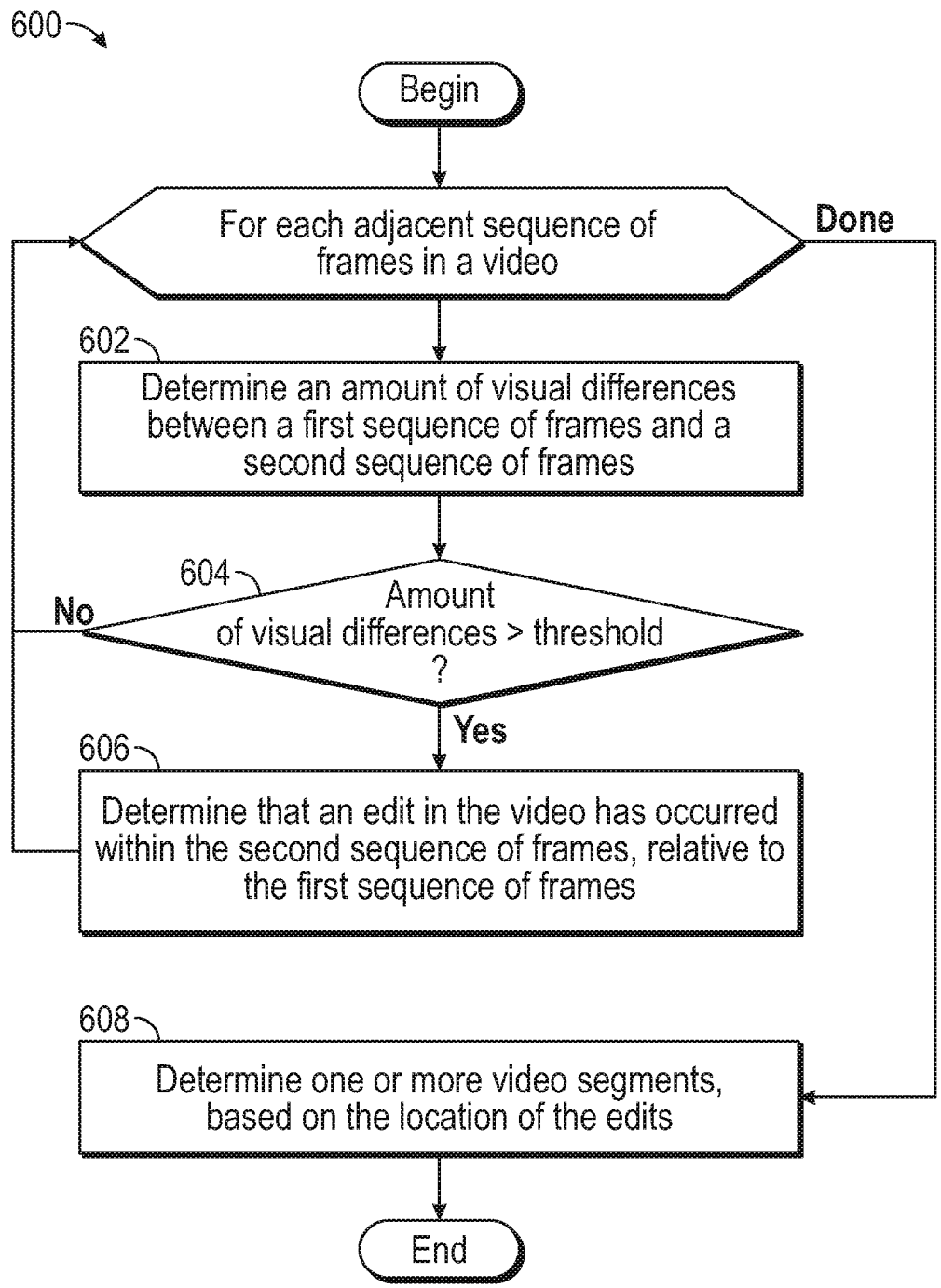
FIG. 6 is a flowchart of a method for determining video segments associated with an object in a video, according to one embodiment.

FIG. 6 is a flowchart of a method 600 for determining video segments associated with an object in a video, according to one embodiment. The method 600 may be performed by one or more components (e.g., video editor 100, segmenter 208, etc.) of a computing system (e.g., computing system 200). The method 600 may be performed as part of blocks 304-306 of method 300 depicted in FIG. 3.

The method 600 begins at block 602, where, for each (subsequent) adjacent sequence of frames in a video, the computing system determines an amount of visual differences between the sequence of frames. For example, the computing system can identify whether a video transition (e.g., cross-fade, diff-to-black, etc.) has occurred between the sequence of frames. At block 604, the computing system determines if the amount of visual differences is greater than a threshold. If so, the computing system determines that an edit in the video has occurred within the second sequence of frames, relative to the first sequence of frames (block 606). In one embodiment, the number of frames in the sequence may be based on the frame rate of the video. For example, assuming the frame rate is thirty frames per second, the computing system can determine the average of the pixels across the first thirty sequence of frames and the average of the pixels across the second thirty sequence of frames, and determine whether an edit has occurred based on the difference between pixel averages. Note, however, that this is merely one reference example of a technique that can be used to determine whether an edit occurred, and that other techniques can be used to identify edit locations.

If, at block 604, the computing system determines that the amount of differences is not greater than the threshold, the computing system performs blocks 602 and 604 for the subsequent pair of adjacent sequence of frames in the video. At block 608, the computing system determines one or more video segments based on the location of the edits. For example, in one embodiment, the computing system can determine that the edit locations correspond to scene breaks in the video (e.g., each scene may correspond to a different video segment).

Figure 7:
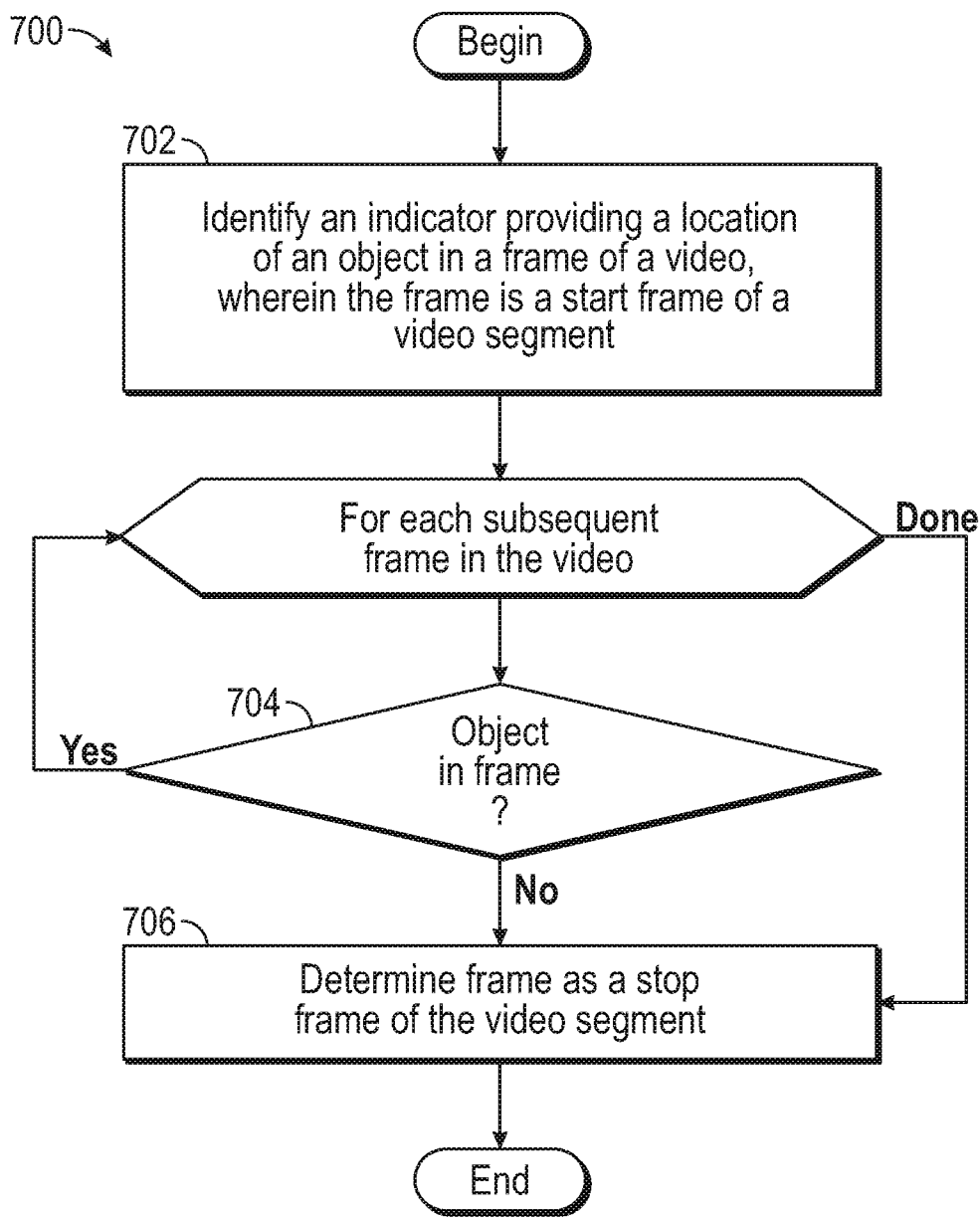
FIG. 7 is a flowchart of a method for determining video segments associated with an object in a video, according to one embodiment.

FIG. 7 is a flowchart of a method 700 for determining video segments associated with an object in a video, according to one embodiment. The method 700 may be performed by one or more components (e.g., video editor 100, segmenter 208, etc.) of a computing system (e.g., computing system 200). The method 700 may be performed as part of blocks 304-306 of method 300 depicted in FIG. 3.

The method 700 begins at block 702, where the computing system identifies a location of an object when it initially appears in a frame of a video. The frame is associated with a start frame of a video segment. For each subsequent frame, the computing system determines if the object is still present. If so, the method performs block 704 for the subsequent frame. If the object is not in the frame, the computing system associates the frame (in which the object is no longer present and/or cannot be measured) with a stop frame of the video segment.

Figure 8:
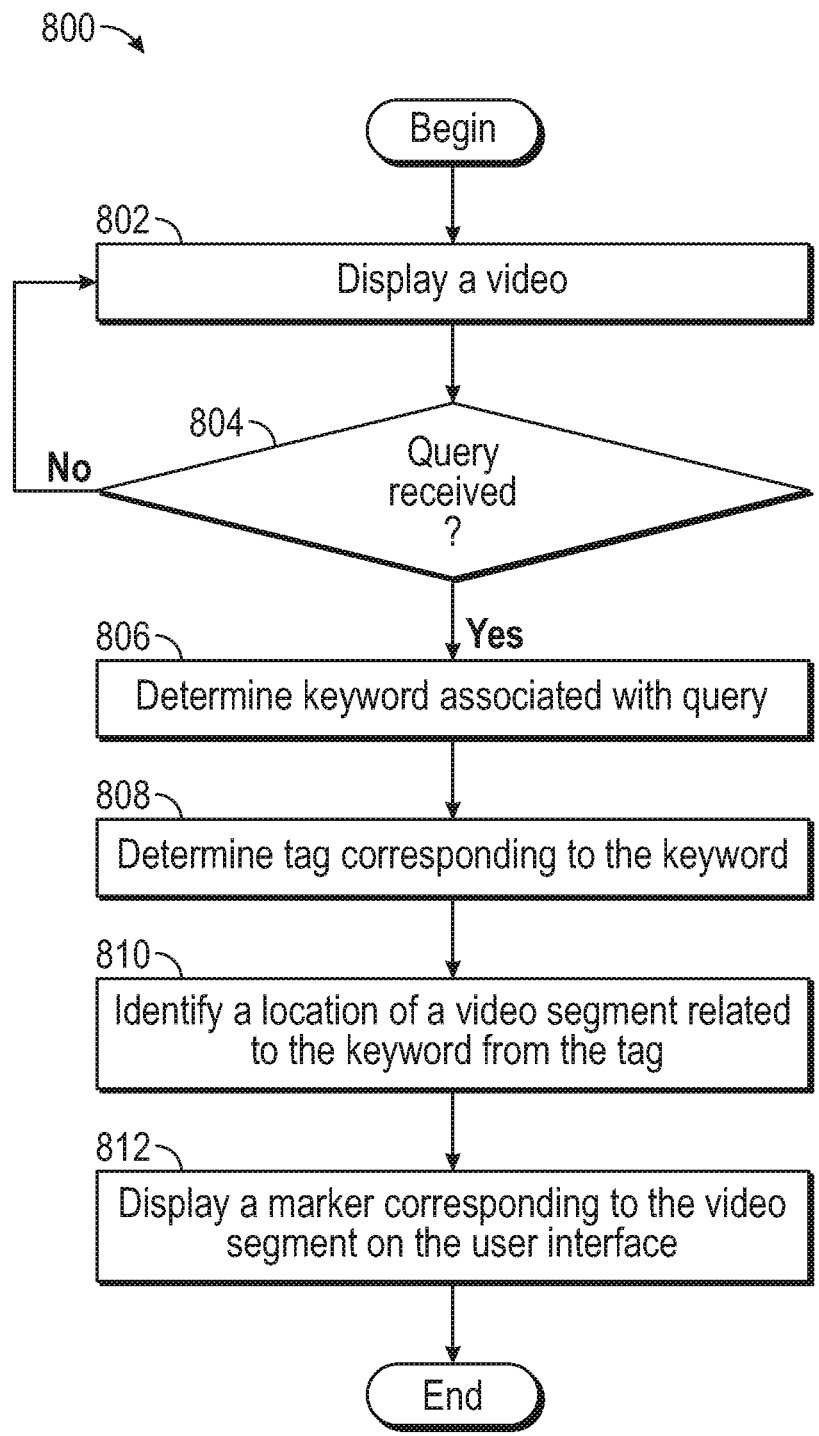
FIG. 8 is a flowchart of a method for displaying tags on a user device, according to one embodiment.

FIG. 8 is a flowchart of a method 800 for displaying tags on a user device, according to one embodiment. The method 800 may be performed by a user device (e.g., user device 230). In one embodiment, the method 800 is performed by a user device that has received a video that includes A/V data and tags using the method 300 described above. The method 800 may begin when a viewer instructs the user device to play a video.

The method 800 begins at block 802, where the user device displays a video. As noted, the user can control when the user device plays the video using a separate I/O device (e.g., a remote) or an integrated I/O device (e.g., touchscreen or trackpad).

At block 804, the user device determines if a query has been received. For example, the user may have paused the video to submit a query regarding an object in the video the user is interested in. If the user device does not detect a query, the method 800 returns to block 802 where the user device continues to play the video. However, once the user device detects a query, the method proceeds to block 806.

At block 806, the user device determines a keyword associated with the query. In one embodiment, the user device may identify a term in the query that corresponds to a keyword for the video. For example, the user may have searched for a word (or term) mentioned in the video about an object. The user device can search metadata transmitted along with the video to determine if the term in the query is a keyword. In other embodiments, the user device may determine that terms in the query are not mentioned in the video. In this case, the user device can identify another keyword similar to the searched term.

At block 808, the user device determines a tag corresponding to the keyword. For example, the user device can search the metadata associated with the video to identify the tag corresponding to the keyword. In some embodiments, the user device can interact with another computing system (e.g., computing system 200) to retrieve the tag. For example, the user device can send a request that includes the keyword to the other computing system and receive, in response, the corresponding tag. At block 810, the user device identifies a location of a video segment related to the keyword from the tag.

At block 812, the user device displays a marker corresponding to the video segment on the user interface. In one embodiment, the user device can display the marker along the timeline (or seeker bar) 160. FIG. 9A illustrates an example UI 900 of a user device, where markers 980A and 980B are displayed on the timeline (or seeker bar) 160. In this example, the video may be a review video describing a particular set of headphones (e.g., object 932). At the current frame 920A, the review video may be introducing the object 932, e.g., by describing various features of the object 932. The user may be interested in hearing more about the comfort (or fit) of the object 932. In this case, the user can search for "comfort" in the search field 904 on the UI 900.

In response, the user device can display markers 980A and 980B corresponding to video segments associated with "comfort" of the object 932.

Figure 9C:
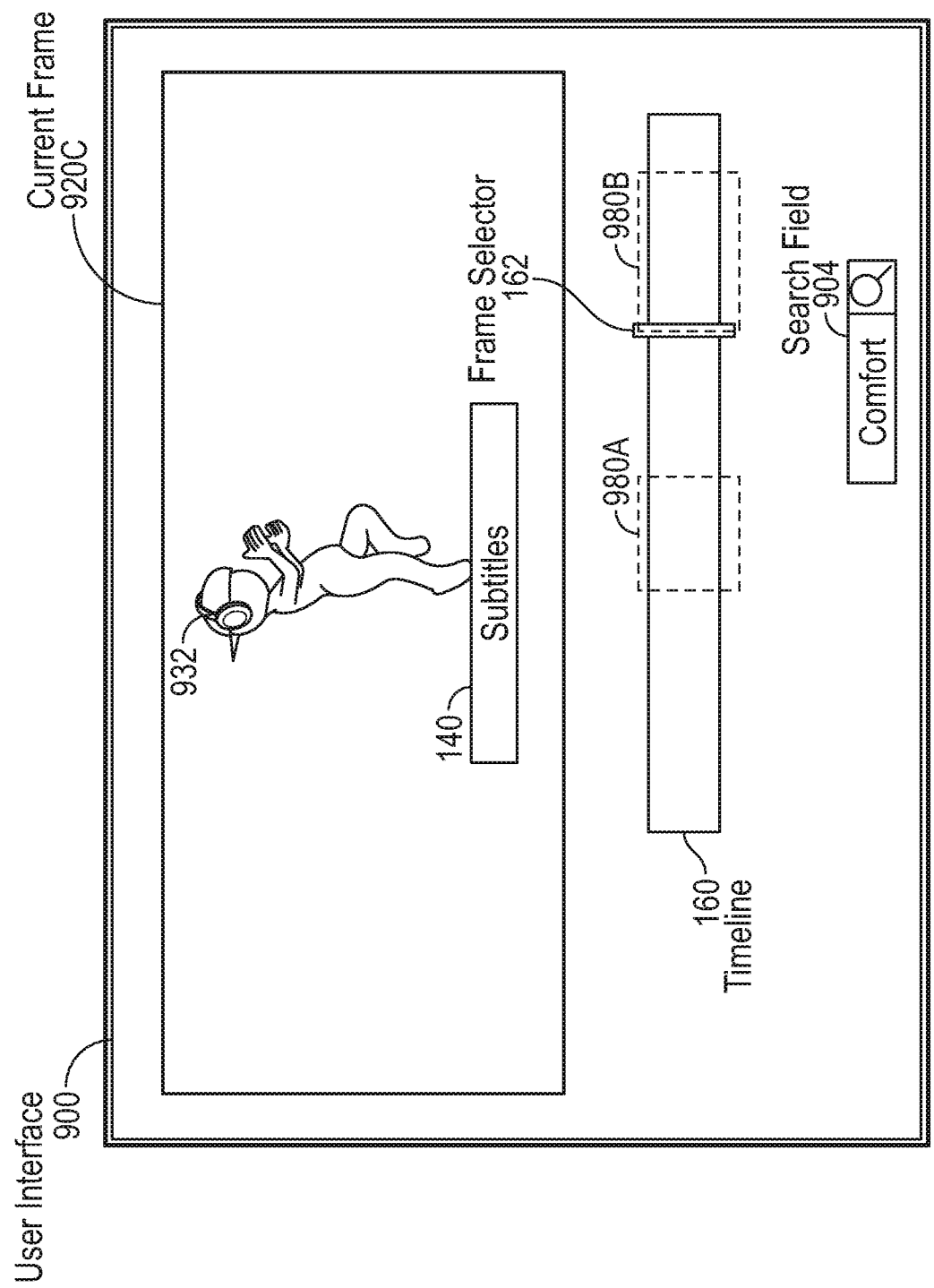

The user can select one of the markers 980A and 980B to go directly to the video segments corresponding to the keyword "comfort." As shown in FIG. 9B, after selecting the marker 980A, the user is taken to current frame 920B of the video associated with "comfort" of the object 932. Subsequently, as shown in FIG. 9C, after selecting the marker 980B, the user is taken to current frame 920C in the video where another instance of "comfort" of the object 932 is mentioned.

Figure 10:
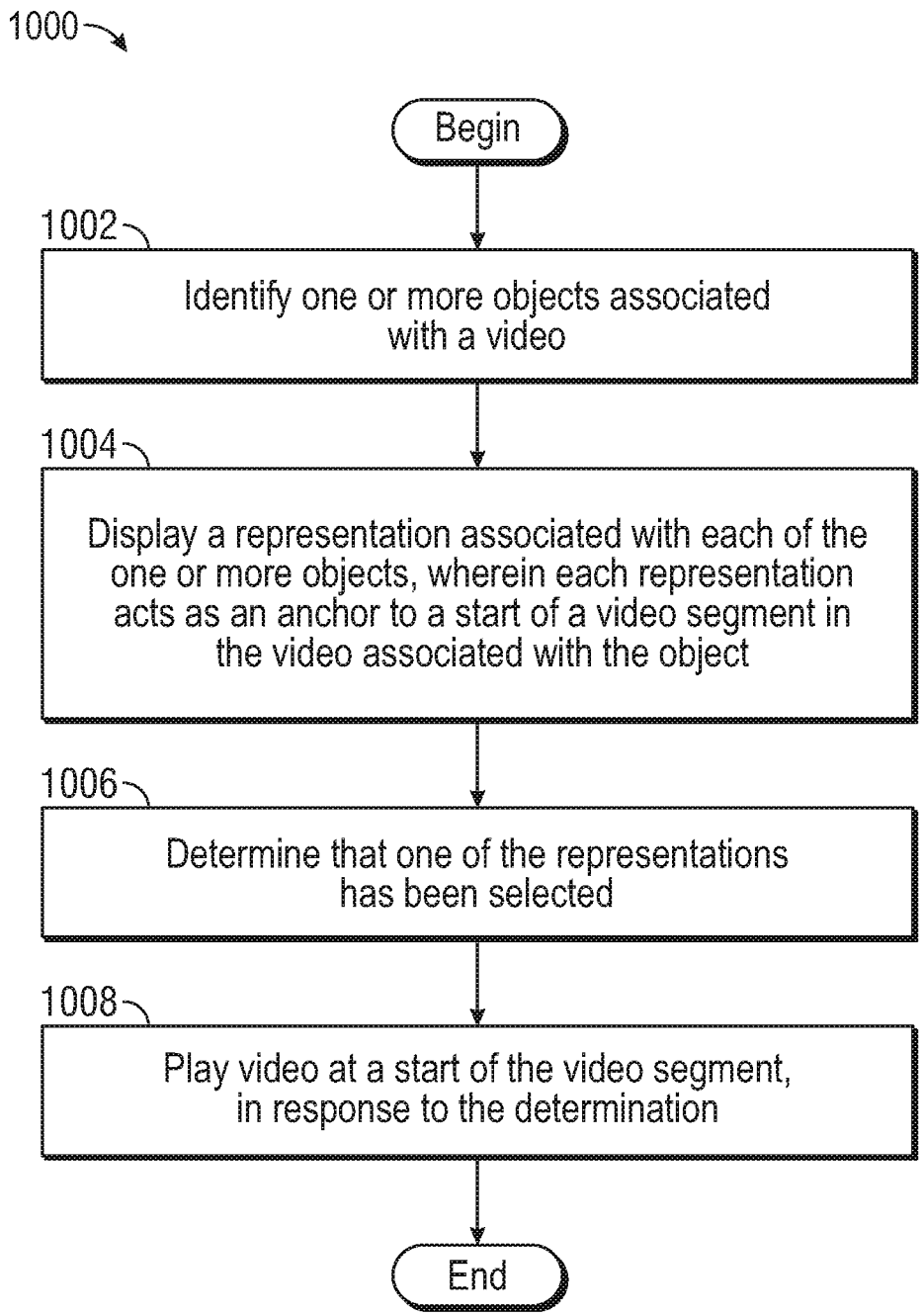
FIG. 10 is a flowchart of a method for playing video segments on a user device, according to one embodiment.

FIG. 10 is a flowchart of a method 1000 for playing video segments on a user device, according to one embodiment. The method 1000 may be performed by a user device (e.g., user device 230). In one embodiment, the method 1000 is performed by a user device that has received a video that has been edited using the method 300 described above.

The method 1000 begins at block 1002, where the user device identifies one or more objects associated with a video. For example, the user device may have a list of object IDs (e.g., product IDs) associated with the video. At block 1004, the user device displays a representation of each of the one or more objects, where each representation acts as an anchor to a start of a video segment in the video. The representation, for example, can include a keyword (e.g., brand name, product ID, etc.) associated with the object, an icon depicting an image of the object, a thumbnail video frame, etc. At block 1006, the user device determines that one of the representations has been selected. At block 1008, the user device plays video at a start of the video segment, in response to the determination.

Figure 11A:
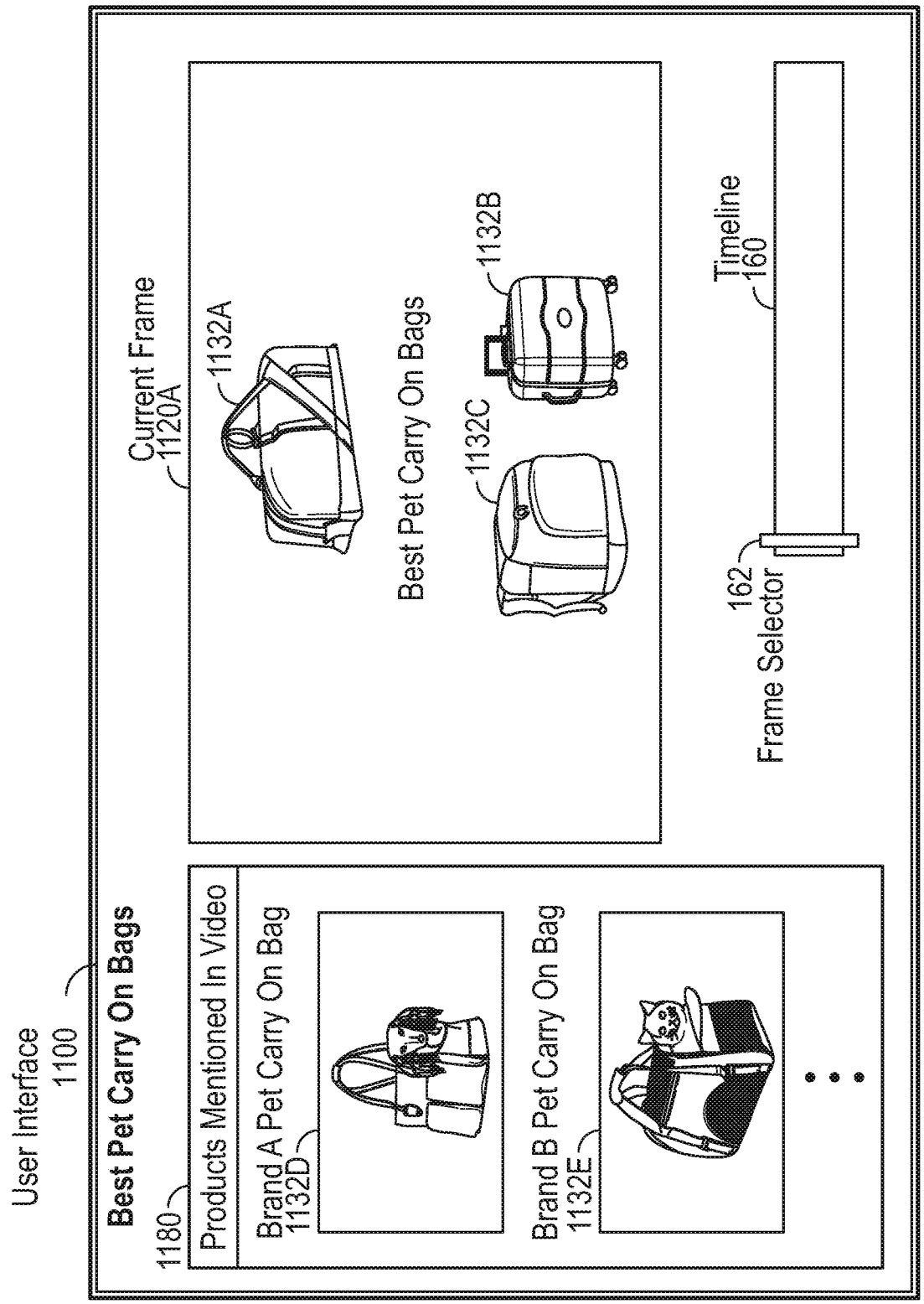
FIGS. 11A-11B illustrate an example user interface of a user device, according to one embodiment.
Figure 11B:
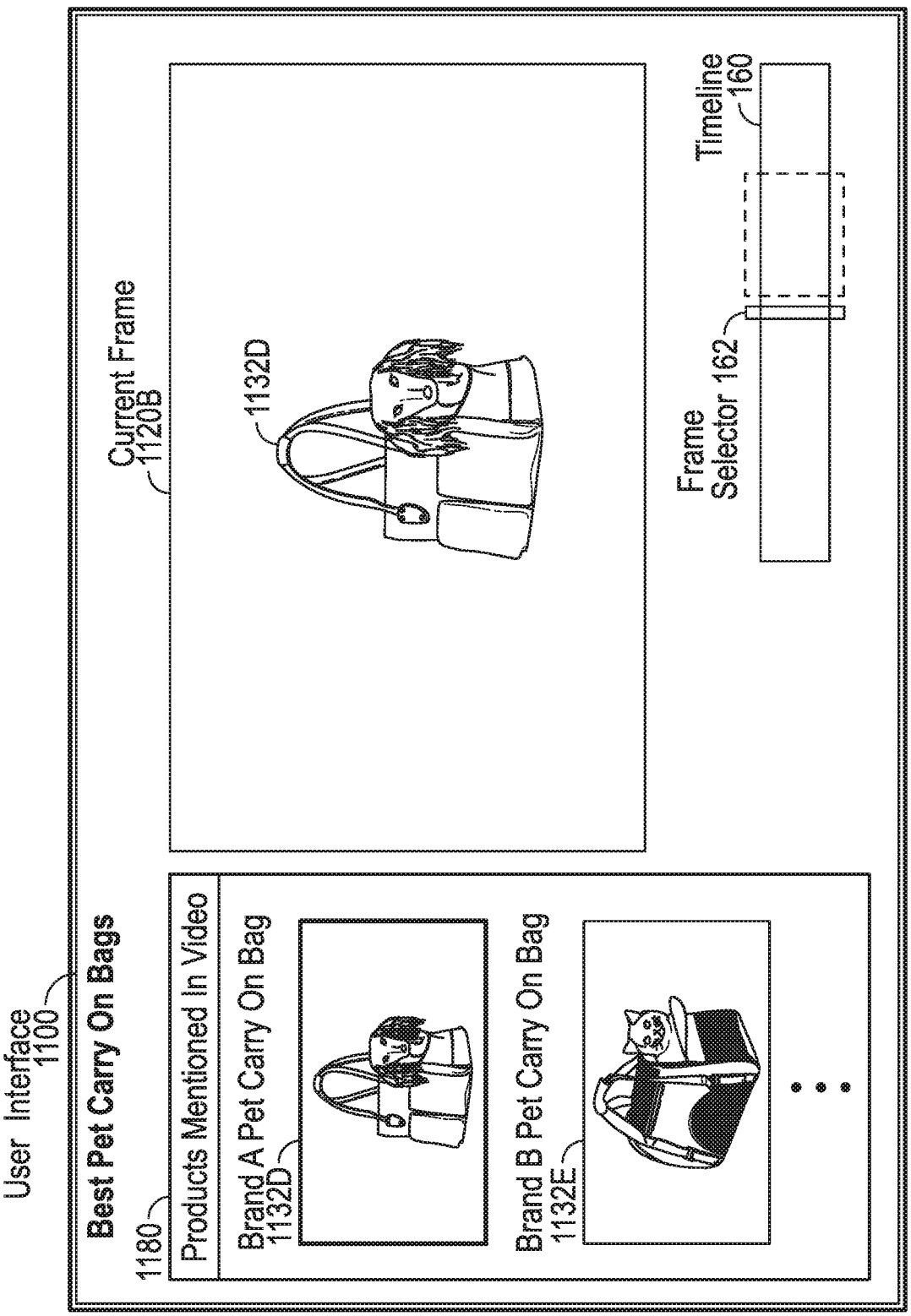

FIGS. 11A-11B illustrate an example UI 1100 of a user device that displays representations of objects associated with a video, according to one embodiment. In this example, the video may be a review video describing the best pet carry-on bags (e.g., objects 1132A, 1132B, 1132C, etc.). At the current frame 1120A, the review video may be playing an introductory title describing the subject of the video.

The UI 1100 includes a panel 1180, which displays a representation of each of the objects that are mentioned in the video. As shown, the panel 1180 includes a representation (e.g., image) of the object 1132D and a representation of the object 1132E. The representations in the panel 1180 acts as anchors to the relevant video segment of the video associated with the object. As shown in FIG. 11B, after the user selects the representation of the object 1132D, the user is taken to current frame 1120B, which is at a start frame of the relevant video segment for the object 1132D.

Figure 12:
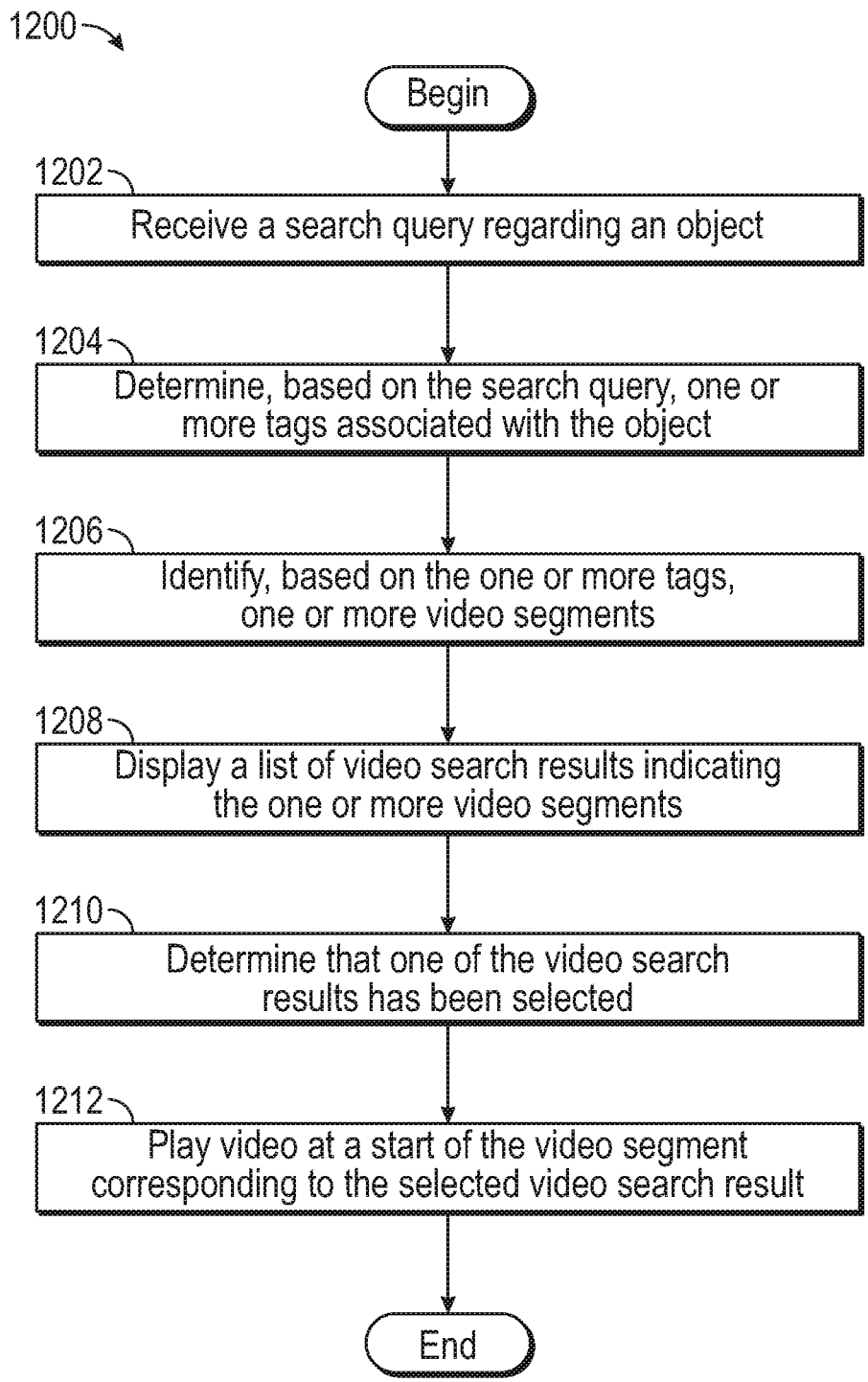
FIG. 12 is a flowchart of a method for playing video segments on a user device, according to one embodiment.

FIG. 12 is a flowchart of a method 1200 for playing video segments on a user device, according to one embodiment. The method 1200 may be performed by a user device (e.g., user device 230).

The method 1200 begins at block 1202, where the user device receives a search query regarding an object. At block 1204, the user device determines, based on the search query, one or more tags associated with the object. In some cases, for example, the search query can include object-related keywords that enable the user device to retrieve the relevant tags.

At block 1206, the user device identifies, based on the one or more tags, one or more video segments. In one embodiment, the one or more video segments may be associated with a same video. In another embodiment, the one or more video segments may be associated with different videos.

At block 1208, the user device displays a list of video search results indicating the one or more video segments. At block 1210, the user device determines that one of the video search results has been selected. At block 1212, the user device plays a video at a start of the video segment corresponding to the selected video search result.

Figure 13:
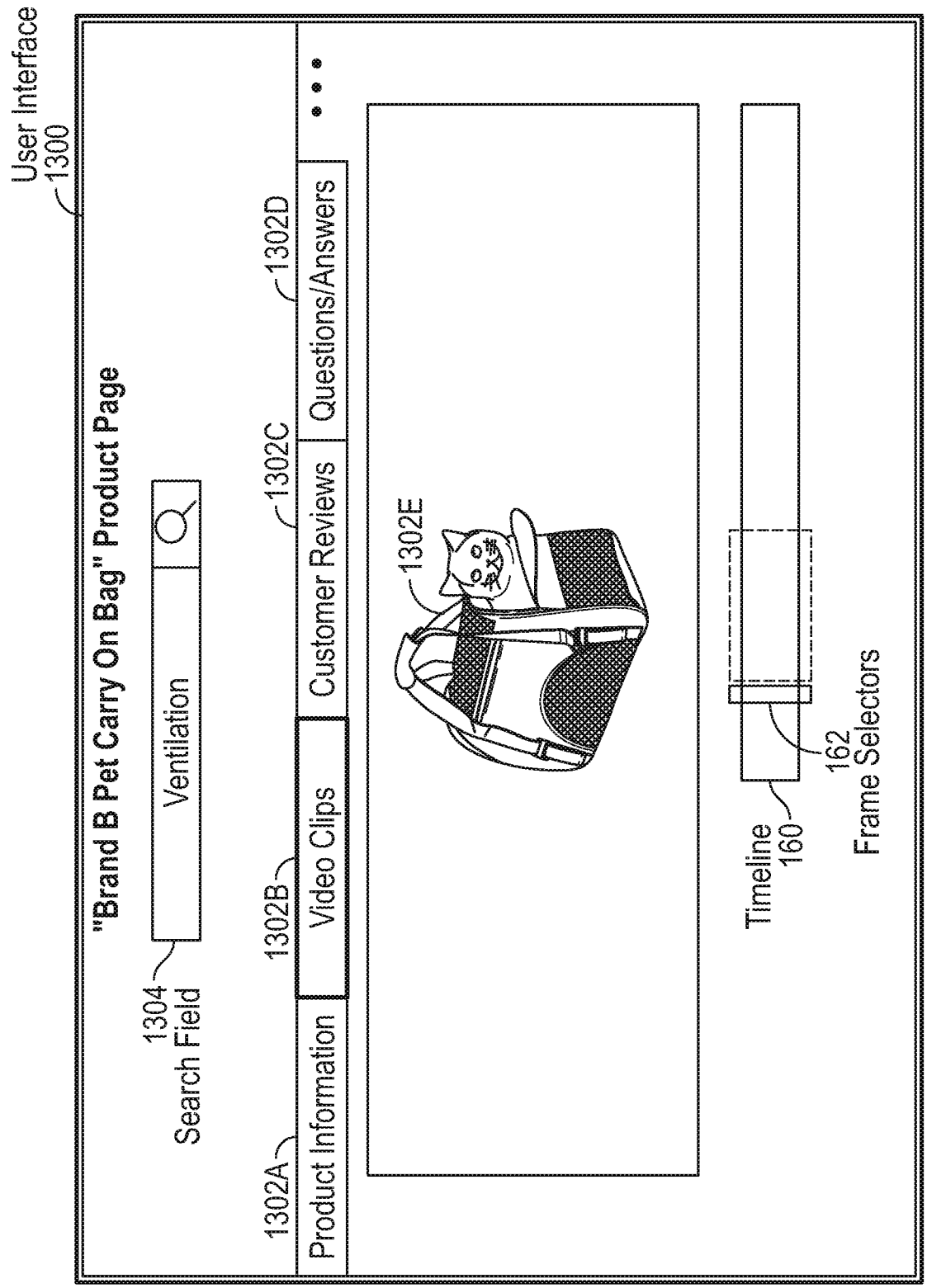
FIG. 13 illustrates an example user interface of a user device, according to one embodiment.

FIG. 13 illustrates an example UI 1300 of a user device that displays a list of video segments in response to a search query, according to one embodiment. Continuing with the example review video referred to FIG. 11, the user may navigate to a particular object (e.g., product) page for more information about the object. Here, for example, the user has navigated to the product page for object 1132E, which includes additional product information 1302A, video clips 1302B, customer reviews 1302C, and questions/answers 1302D. In one embodiment, the UI 1300 may permit the user to use search field 1304 to search for additional information within additional product information 1302A, video clips 1302B, customer reviews 1302C, and questions/answers 1302D.

In this example, the user may be interested in learning more about the "ventilation" of object 1132E and may input "ventilation" as a keyword into the search field 1304. In response, the user is presented with a video that plays at a start frame of the video segment that is related to "ventilation" of the object 1132E.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., video distribution network, segmenter 208) or related data available in the cloud. For example, the video distribution network could execute on a computing system in the cloud and distribute videos with embedded tags to the user devices or respond to request for tags from user devices. In another example, the segmenter 208 could execute on a computing system in the cloud and distribute video segments associated with a particular object in a video. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
   identifying a product for sale associated with a video;
   determining one or more attributes of audio content and video content within the video, based on an analysis of audio/visual (A/V) data associated with the video;
   determining a video segment within the video that is associated with the product for sale, based at least in part on the one or more attributes of the audio content and the video content within the video;
   generating a tag associating the product for sale with the video segment, wherein the tag indicates a product identifier (ID) for the product for sale and a location of the video segment within the video;
   generating a package comprising the A/V data and the tag; and
   transmitting the package to a user device.

2. The method of claim 1, wherein the location of the video segment is indicated by a start frame and a stop frame within a duration of the video.

3. The method of claim 1, wherein the tag further indicates a context of at least one of audio content and video content of the video segment within a hierarchy of contexts associated with the video.

4. The method of claim 1, wherein determining the one or more attributes of the audio content and the video content within the video comprises identifying one or more edit locations within the video.

5. The method of claim 4, wherein the one or more edit locations are identified based on at least one of a number of audio transitions that occur within the video, a number of frames of the video in which a text overlay appears, and a number of scene breaks within the video.

6. A method comprising:
   identifying at least one object associated with a video;
   determining one or more attributes of at least one of audio content and video content within the video, based on an analysis of audio/visual (A/V) data associated with the video;
   generating a video segment within the video that is associated with the at least one object, based at least in part on the one or more attributes of at least one of the audio content and the video content within the video; and
   generating a tag associating the at least one object with the video segment, wherein the tag indicates an identifier (ID) for the at least one object and a location of the video segment within the video.

7. The method of claim 6, wherein determining the one or more attributes of at least one of the audio content and the video content within the video comprises determining a speech pause cadence of a voice within the audio content of the video.

8. The method of claim 7, wherein determining the speech pause cadence comprises:
   determining, for each word spoken in the video, a time instance in the video when the word is spoken;
   determining an elapsed amount of time between each adjacent pair of time instances, wherein the elapsed amount of time corresponds to a speech pause between the words spoken at the time instances; and
   identifying one or more of the speech pauses having an elapsed amount of time that satisfies a predetermined condition.

9. The method of claim 8, wherein the video segment is generated based on a number of the one or more of the speech pauses having the elapsed amount of time that satisfies the predetermined condition.

10. The method of claim 6, wherein:
   determining the one or more attributes of at least one of the audio content and the video content within the video comprises determining an edit location within the video; and
   determining the edit location comprises:
      determining that an amount of visual differences between a first sequence of frames and a second sequence of frames satisfies a predetermined condition; and
      determining that an edit has occurred within the second sequence of frames, relative to the first sequence of frames.

11. The method of claim 6, wherein determining the one or more attributes of at least one of the audio content and the video content within the video comprises determining a location of the at least one object within a first frame of the video.

12. The method of claim 11, wherein generating the video segment comprises:
   tracking the location of the at least one object in one or more second frames subsequent to the first frame;
   selecting the first frame as a start frame for the video segment; and
   selecting a last frame of the one or more second frames as a stop frame for the video segment.

13. The method of claim 6, wherein generating the video segment comprises evaluating the one or more attributes of at least one of the audio content and the video content with a machine learning model to identify a start frame and a stop frame for the location of the video segment within the video.

14. The method of claim 13, wherein the machine learning model is trained using data indicating locations of a plurality of video segments in one or more videos, the locations of the plurality of video segments being provided by one or more users.

15. A method comprising:
   receiving a search query regarding an object;
   determining, based on the search query, one or more tags associated with the object;

identifying, based on the one or more tags, one or more video segments associated with the object;

displaying, in response to the search query, a list of the one or more video segments on a user device; and upon determining that one of the video segments has been selected, playing a video at a start frame of the selected video segment.

16. The method of claim 15, wherein the one or more video segments are associated with a same video.

17. The method of claim 15, wherein:

a first video segment of the one or more video segments is associated with a first video; and a second video segment of the one or more video segments is associated with a second video different from the first video.

18. The method of claim 15, wherein:

the object comprises a product for sale; and each tag comprises a product identifier (ID) uniquely identifying the product for sale, an indication of a location of a video segment corresponding to the product ID, and one or more keywords associated with the video segment.

19. The method of claim 18, wherein:

the search query comprises a keyword associated with the object; and determining the one or more tags associated with the object comprises selecting tags that include the keyword in the search query.

20. The method of claim 19, wherein the keyword in the search query comprises a term indicating a model of the product for sale.

\* \* \* \* \*